May 8, 1962 R. V. MINER 3,032,814
CENTRIPETAL EXTRUDER
Filed Aug. 25, 1959
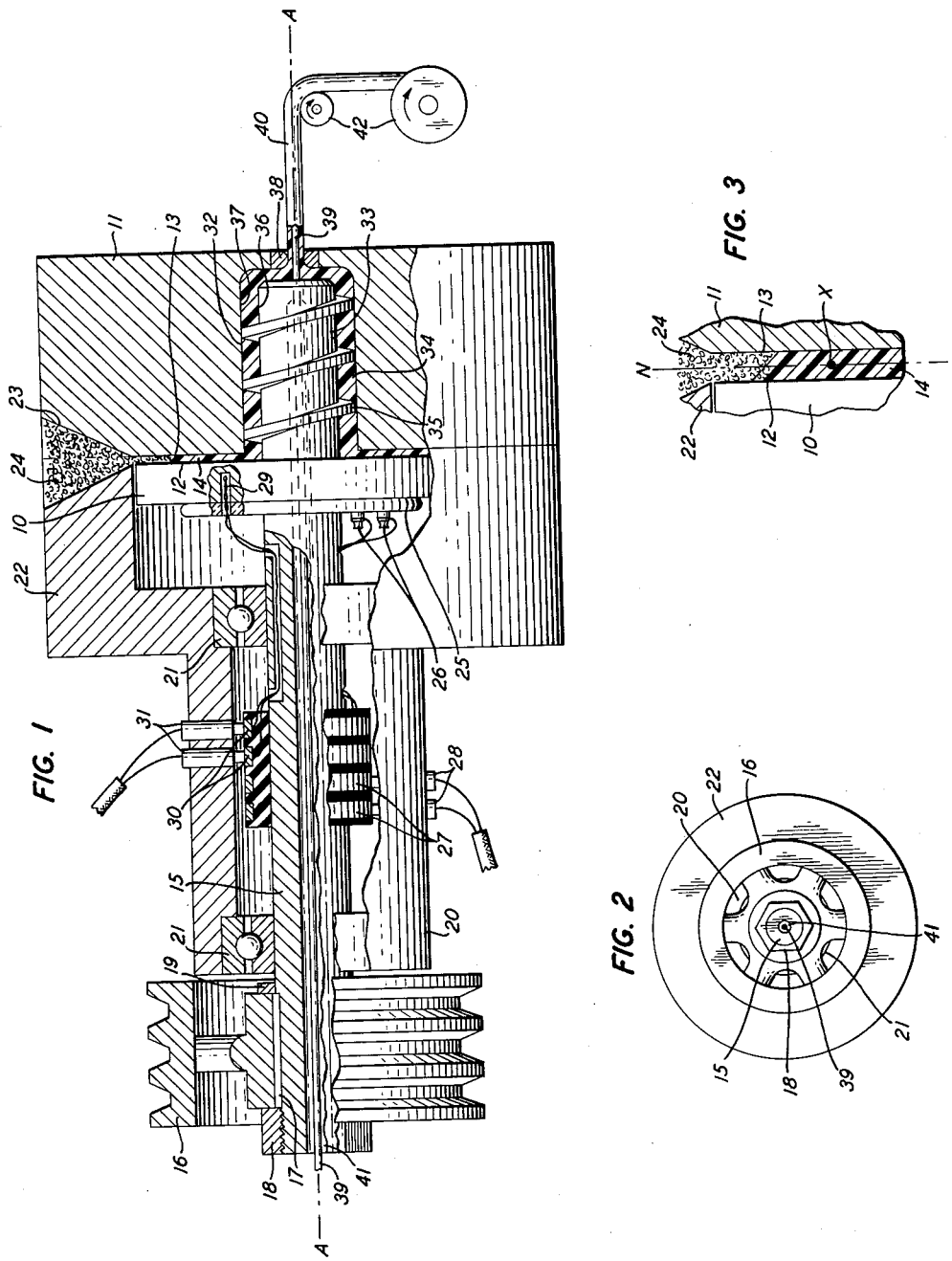
INVENTOR
R. V. MINER
BY Albert R. Hodges
ATTORNEY

United States Patent Office 3,032,814
Patented May 8, 1962

---

3,032,814
CENTRIPETAL EXTRUDER
Robert V. Miner, Flemington, N.J., assignor to Western Electric Company, Incorporated, New York, N.Y., a corporation of New York
Filed Aug. 25, 1959, Ser. No. 836,009
5 Claims. (Cl. 18—12)

This invention relates generally to centripetal extruders, and more particularly to new and improved centripetal extruders which are capable of providing industrial extruding pressures.

The relatively small size of the centripetal extruder of the prior art makes it an industrially desirable tool. Unfortunately, its applicability has been limited due to the very low extruding pressures it is capable of providing. For example, the maximum extruding pressure obtainable with such an extruder is in the area of 400 pounds per square inch. Most industrial applications, however, require extruding pressures of at least 2000 pounds per square inch.

An object of the invention is to provide new and improved centripetal extruders.

A further object of the invention is to provide new and improved centripetal extruders which are capable of providing industrially suitable extruding pressures without material increase in size.

An apparatus illustrating certain aspects of the invention may comprise a pair of plates mounted in spaced relationship along an axis of rotation to define an extrusion channel therebetween, one of the plates having an orifice therethrough which communicates with such extrusion channel, means for feeding plastic material into the outer portion of the extrusion channel, means for causing relative rotation between the plates to advance the plastic material centripetally through the channel toward the orifice, a core member disposed within the orifice to define an extrusion passage between the outer surface of the core member and the inner surface of the orifice, a helical screw formed in one of these surfaces, and means for causing relative rotation between such surfaces to cause the helical screw to convey the plastic material through the extrusion passage.

A complete understanding of the invention may be obtained from the following detailed description of means forming a specific embodiment thereof, when read in conjunction with the appended drawing, in which:

FIG. 1 is an elevation, partially in cross-section, of a centripetal extruder forming one embodiment of the invention;

FIG. 2 is an end view of the centripetal extruder of FIG. 1; and

FIG. 3 is an enlarged view of a portion of the extrusion channel included within the centripetal extruder of FIG. 1.

Basically, the centripetal extruder of FIG. 1 comprises a pair of plate members 10 and 11 having plate surfaces 12 and 13, respectively. These members are mounted along an axis of rotation AA in spaced relationship so that the plate surfaces 12 and 13 define a radial channel 14 therebetween. Preferably, the axis of rotation AA is horizontally oriented. In this embodiment, the channel 14 is linear and forms an angle of 90° with the axis of rotation AA. Centripetal extruders are not limited to such configuration, however, as illustrated in copending application Serial No. 805,418 filed April 10, 1959 now Patent Number 2,977,632 and assigned to the same assignee as the present application, wherein curved extrusion channels lead centripetally or radially inward toward an axis of rotation.

The plate members 10 and 11 are adapted to rotate relative to one another about the axis AA. In this embodiment, the plate member 11 is maintained stationary, while means are provided for rotating the plate member 10. To this end, the plate member 10 is attached to a shaft 15. The shaft 15 is mounted in axial coincidence with the axis AA by means of a fixed housing 20 and ball bearings 21. A pulley 16 is suitably attached to the shaft 15, as for example through a key arrangement 17, with the pulley being axially restrained by means of a nut 18 which tightly locks it against a shoulder 19. A conventional belt drive attached to the pulley 16 may then be provided to rotate the shaft 15 and, consequently, the plate member 10. The plate member 11 may, advantageously, be restrained against rotation by attaching it to an extension 22 of the housing 20.

In the operation of the centripetal extruder of FIG. 1, plastic material is fed into the channel 14. Mating hollows in the extension housing 22 and the plate member 11 cooperate to form a funnel-shaped hopper 23 which facilitates this feeding, the radial clearance between the rotating plate member 10 and the extension housing 22 being made very small so as to prevent the escape of any of the material fed into the hopper. Preferably, the plastic material is provided in the form of pellets 24. These pellets fall through the hopper 23 into the radially outer portion of the channel 14.

In centripetal extrusion, the material to be extruded should be in a highly viscous or gummy state so that it will tend to adhere to itself and to the plate surfaces 12 and 13. Thereby, a high rate of shear is caused within the material when the plate members 10 and 11 are rotated relative to one another. Obviously, either of the plate members may rotate, or both of the plate members may rotate, to achieve the desired relative rotation. Ordinarily, exogenous heat is applied to one or both of the plate members 10 and 11 in order to initially convert the plastic pellets 24 into a viscous state or a viscoelastic liquid. In this embodiment, the plate member 10 is heated by means of an electrical heating pad 25. Electrical power is applied to the heating pad 25 through a pair of terminals 26 which are connected by means of wires passing through a channel in the shaft 15 to a pair of rings 27. The rings, in turn, are connected through a pair of brushes 28 to an external source of power (not shown). Once the plastic pellets have been so converted, the application of exogenous heat may be stopped since the working of the viscous material between the plate members 10 and 11 creates enough heat to sustain the operation. Such stoppage may be effected by means of a thermocouple 29 inserted within the plate member 10 and connected by wires extending through a channel in the shaft 15, a pair of rings 30, and a pair of brushes 31 to an external control (not shown) which cuts off the power applied to the terminals 26 in response to the attainment of a preselected temperature reading at the thermocouple 29.

In accordance with known principles of centripetal extrusion, relative rotation between the plate members 10 and 11 also advances the plastic material centripetally (that is, radially inward in all directions) through the channel 14 toward the axis of rotation AA. This centripetal motion of the viscous plastic mass within the extrusion channel 14 creates a radial pressure gradient having its maximum value along the radially innermost portion of the channel. Nevertheless, the greatest pressure obtainable along the innermost portion of the channel 14 is not enough for most industrial applications.

The present invention provides means which, without material sacrifice in compactness, elevate the extrusion pressures providable by centripetal extruders to industrial values. According to the invention, an orifice 32, which communicates with the channel 14, is provided through one of the plate members, in this case the plate member 11. A core member 33 is arranged within the orifice 32 to form an extrusion passage 34 between the outer surface 36 of the core member and the inner surface 37 of the orifice. A helical screw 35 is formed in one of the surfaces defining the extrusion passage 34, while a die member 38 is positioned at the exit end of the extrusion passage. As seen in FIG. 1, the flights of helical screw 35 are generally of rectangular cross section and are of equal lead. The channel between such flights, extrusion passage 34, is of generally uniform cross section as it progresses spirally along the length of core member 33. Means are provided for causing relative rotation of the outer surface 36 of the core member 33 relative to the inner surface 37 of the orifice 32. Advantageously, this is effected by arranging the orifice 32 in axial coincidence with the axis of rotation AA so that the core member 33 may be attached to the plate member 10 to rotate therewith. The helical screw 35 is, then, preferably formed on the surface 36 of the core member, as shown.

Relative rotation in the appropriate direction between the surfaces 36 and 37 causes the helical screw 35 to convey plastic material from the inner portion of the channel 14 through the extrusion passage 34 to the die member 38. Such relative rotation in the appropriate direction may, advantageously, be accomplished by maintaining plate member 11 stationary and rotating plate member 10 in a clockwise direction. Since core member 33 having a helical screw 35 preferably formed on the surface 36 thereof is fixed to plate member 10, clockwise rotation (as viewed from the right hand end of FIG. 1) of plate member 10 provides the same rotation for core member 33. Clockwise rotation of core member 33 causes helical screw 35 to exert pressure on the plastic material or viscoelastic liquid contained in extrusion passage 34. This pressure is exerted on the plastic material in an axially rightward direction (as viewed in FIG. 1) to convey the material to die member 38.

The extrusion passage 34 may be designed in accordance with the principles applicable to screw-type extruders in general, so as to increase the pressure applied to the plastic material to an industrially usable value at the die member 38. It has been found that industrial extrusion pressures are thus obtainable without material increase in the size of the centripetal extruder. For example, an appropriately designed extrusion passage only six inches in length is sufficient to raise the extrusion pressure from approximately 400 pounds per square inch at the inner portion of the channel 14 to approximately 3000 pounds per square inch at the extrusion die 38.

The improved extruder of this invention is particularly useful in the extrusion of plastic coverings upon filamentary cores. In such application, the shaft 15, the plate member 10, and the core member 33 are provided with a longitudinal bore 41 which is axially coincident with the axis AA and through which a filamentary core, such as a wire 39, is passed. The wire 39 also extends through the die member 38 and is continuously advanced therethrough by means of motor-driven rollers 42. Within the die member, the plastic material forced through the extrusion passage 34 is formed into a tubular sheath surrounding the advancing wire, resulting in an insulating covering 40. The extruders previously employed to effect such function were at least three times as long as the extruder of this invention. The relatively short axial length of this extruder is of considerable aid in facilitating the initial threading of a filamentary core through the extruder, and in maintaining coincidence of the filamentary core with the axis of the extruder throughout the coating process.

It is to be understood that the above-described embodiment is simply illustrative of the application of the principles of the invention. Numerous other arrangements may be devised by those skilled in the art which will embody the principles of the invention and fall within the spirit and scope thereof.

What is claimed is:

1. A centripetal extruder, comprising a pair of plates mounted in spaced relationship along an axis of rotation to define an extrusion channel therebetween, one of said plates having an orifice therethrough which communicates with said extrusion channel, means for feeding plastic material into the outer portion of said extrusion channel, means for causing relative rotation between said plates to advance said plastic material centripetally through said channel toward said orifice, a core member disposed within said orifice to define an extrusion passage between the outer surface of said core member and the inner surface of said orifice, a helical screw formed in one of said surfaces, and means for causing relative rotation between said surfaces to cause said helical screw to convey said plastic material through said extrusion passage.

2. A centripetal extruder, comprising a pair of plates mounted in spaced relationship along an axis of rotation to define an extrusion channel therebetween, one of said plates having an orifice therethrough which communicates with said extrusion channel, means for feeding plastic material into the outer portion of said extrusion channel, means for causing relative rotation between said plates to advance said plastic material centripetally through said channel toward said orifice, a core member disposed within said orifice to define an extrusion passage between the outer surface of said core member and the inner surface of said orifice, a helical screw formed in one of said surfaces, an extrusion die member positioned at the remote end of said extrusion passage relative to said extrusion channel, and means for causing relative rotation between said surfaces to cause said helical screw to convey said plastic material through said extrusion passage and said die member.

3. A centripetal extruder, comprising a pair of plates mounted in spaced relationship along an axis of rotation to define an extrusion channel therebetween, one of said plates having an orifice therethrough which communicates with said extrusion channel and which is axially coincident with said axis of rotation, means for feeding plastic material into the outer portion of said extrusion channel, means for causing relative rotation between said plates to advance said plastic material centripetally through said channel toward said orifice, and a core member attached to the other of said plates and extending into said orifice to define an extrusion passage between the outer surface of said core member and the inner surface of said orifice, a helical screw being formed in one of said surfaces to convey said plastic material through said extrusion passage.

4. An apparatus for extruding a viscoelastic liquid comprising a pair of spaced rotatable plates, an elongated member fixed to the center of one of said plates and extending through an aperture in the center of the other, a helical screw fixed to said member to form an extrusion channel, means for feeding the viscoelastic liquid into the space between said plates, and means for simultaneously producing relative rotation between said plates and rotation of said member to force centripetally said liquid from said space into and through said extrusion channel.

5. A centripetal extruder for applying a covering of plastic material to an advancing filamentary core, comprising a pair of plates mounted in spaced relationship along an axis of rotation to define an extrusion channel therebetween, one of said plates having an orifice therethrough which communicates with said extrusion channel and which is axially coincident with said axis of rotation, means for feeding plastic material into the outer portion of said extrusion channel, means for causing relative rotation between said plates to advance said plastic material centripetally through said channel toward said orifice, a core member attached to the other of said plates and extending into said orifice to define an extrusion passage between the outer surface of said core member and the inner surface of said orifice, said core member having a bore extending longitudinally therethrough, an extrusion die member positioned at the remote end of said extrusion passage relative to said extrusion channel, and means for advancing said filamentary core through said bore and through said die member, a helical screw being formed in one of said surfaces defining said extrusion passage to convey said plastic material through said extrusion passage and said die member.

References Cited in the file of this patent

UNITED STATES PATENTS

| | | |
|---|---|---|
| 1,516,968 | Johnson | Nov. 25, 1924 |
| 2,369,359 | MacWilliam et al. | Feb. 13, 1945 |
| 2,933,175 | Gray | Apr. 19, 1960 |

FOREIGN PATENTS

| | | |
|---|---|---|
| 812,242 | Great Britain | Apr. 22, 1959 |